United States Patent
Wood (10) Patent No.: US 10,125,257 B2
(45) Date of Patent: Nov. 13, 2018

(54) POLYMERIC MATERIALS

(71) Applicant: Victrex Manufacturing Limited, Lancashire (GB)

(72) Inventor: Alan Wood, Cumbria (GB)

(73) Assignee: Victrex Manufacturing Limited, Lancashire (GB)

(*) Notice: Subject to any disclaimer, the term of this patent is extended or adjusted under 35 U.S.C. 154(b) by 69 days.

(21) Appl. No.: 14/910,958

(22) PCT Filed: Jul. 14, 2014

(86) PCT No.: PCT/GB2014/052147
§ 371 (c)(1),
(2) Date: Feb. 8, 2016

(87) PCT Pub. No.: WO2015/019047
PCT Pub. Date: Feb. 12, 2015

(65) Prior Publication Data
US 2016/0208090 A1  Jul. 21, 2016

(30) Foreign Application Priority Data

Aug. 9, 2013  (GB) .................................. 1314321.9

(51) Int. Cl.
| | | |
|---|---|---|
| B32B 27/28 | (2006.01) | |
| C08J 5/12 | (2006.01) | |
| C08L 61/16 | (2006.01) | |
| B32B 7/02 | (2006.01) | |
| B32B 27/12 | (2006.01) | |
| B32B 3/12 | (2006.01) | |
| B29L 15/00 | (2006.01) | |
| B29C 45/16 | (2006.01) | |
| B29K 71/00 | (2006.01) | |
| B29K 271/00 | (2006.01) | |

(52) U.S. Cl.
CPC ............ *C08L 61/16* (2013.01); *B32B 3/12* (2013.01); *B32B 7/02* (2013.01); *B32B 27/12* (2013.01); *B32B 27/288* (2013.01); *C08J 5/12* (2013.01); *B29C 45/16* (2013.01); *B29K 2071/00* (2013.01); *B29K 2271/00* (2013.01); *B29L 2015/00* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/704* (2013.01); *B32B 2307/714* (2013.01); *B32B 2605/003* (2013.01); *C08J 2371/00* (2013.01)

(58) Field of Classification Search
CPC .......... B32B 27/12; B32B 27/288; C08J 5/12; C08J 5/121
See application file for complete search history.

(56) References Cited

U.S. PATENT DOCUMENTS

| | | | | |
|---|---|---|---|---|
| 4,320,224 A * | 3/1982 | Rose | .................... | C08G 61/127 528/125 |
| 4,766,197 A * | 8/1988 | Clendinning | ...... | C08G 65/4012 528/125 |
| 4,904,532 A * | 2/1990 | Staniland | .................. | C08J 5/04 428/408 |
| 5,188,697 A * | 2/1993 | Lueghamer | ............. | B29C 57/00 156/158 |
| 5,256,475 A | 10/1993 | Koyanagi et al. | | |
| 5,418,035 A * | 5/1995 | Iguchi | .................... | B29C 53/04 139/420 A |
| 5,554,677 A * | 9/1996 | Nagaoka | ............... | C08F 283/04 524/494 |
| 6,372,294 B1 | 4/2002 | Vodermayer et al. | | |
| 2011/0168289 A1* | 7/2011 | Kourogi | .................. | B29C 65/20 138/155 |
| 2011/0212290 A1 | 9/2011 | Crawley et al. | | |
| 2011/0315263 A1* | 12/2011 | Bertelo | ..................... | B32B 1/08 138/137 |
| 2012/0090770 A1* | 4/2012 | Cavaliere | ................ | B29C 70/30 156/172 |
| 2013/0025735 A1* | 1/2013 | Kuhmann | ............. | B29C 53/581 138/137 |

(Continued)

FOREIGN PATENT DOCUMENTS

| | | |
|---|---|---|
| DE | 4140499 | 6/1993 |
| DE | 10008375 | 9/2001 |
| EP | 102158 | 3/1984 |
| EP | 102159 | 3/1984 |
| EP | 1215022 | 6/2002 |
| JP | 04249152 | 9/1992 |
| WO | 1999062672 | 12/1999 |
| WO | 03093354 | 11/2003 |
| WO | 2008047091 | 4/2008 |
| WO | 2011117607 | 9/2011 |
| WO | 2014089023 | 6/2014 |

OTHER PUBLICATIONS

Machine translation of DE 10008375, 2017.*
Cogswell, The microstructure of Aromatic Polymer Composites, Thermoplastic Aromatic Polymer Composites, 1992 (Year: 1992).*
United Kingdom Search Report for Application No. 1412495.2 dated Jan. 14, 2015 (2 pages).
International Search Report for Application No. PCT/GB2014/052147 dated Nov. 3, 2014 (3 pages).

*Primary Examiner* — Liam J Heincer
(74) *Attorney, Agent, or Firm* — Michael Best & Friedrich LLP (57) ABSTRACT

A component comprises a first part and a second part, wherein said second part is in contact with said first part, wherein: (i) said first part comprises a first polymer which is semi-crystalline and includes phenylene moieties, carbonyl moieties and ether moieties; (ii) said second part comprises a second polymer which is semi-crystalline and includes phenylene moieties, carbonyl moieties and ether moieties; (iii) the melting temperature (Tm) of the second polymer is less than the melting temperature (Tm) of the first polymer. In a preferred embodiment, said first polymer is polyetheretherketone and said second polymer is a copolymer having a repeat unit of formula VIII and a repeat unit of formula IX.

19 Claims, 5 Drawing Sheets

(56) References Cited

U.S. PATENT DOCUMENTS

| | | | |
|---|---|---|---|
| 2013/0032240 A1* | 2/2013 | Kuhmann | B32B 1/08 138/137 |
| 2013/0056108 A1* | 3/2013 | Wood | B29C 47/0023 138/140 |
| 2016/0208090 A1* | 7/2016 | Wood | C08J 5/12 |
| 2017/0057163 A1* | 3/2017 | Chaplin | B33Y 70/00 |

* cited by examiner

POLYMERIC MATERIALS

BACKGROUND OF THE INVENTION

This invention relates to polymeric materials. Preferred embodiments relate to components which comprise first and second parts in direct contact with one another, wherein the first and second parts comprise polymeric materials having different properties. For example, the first part may be overmoulded on the second part.

In recent years, the aerospace industry has moved to greater adoption of thermoplastics composites due to the ease and speed of fabrication and the ability to combine sub-components into modular systems. One technique currently being developed is that of overmoulding composite components with standard injection moulding polymers. This enables use of relatively simple planar laminates comprising thermoplastic polymers which are overmoulded with another thermoplastic polymer to define more complex three-dimensional shapes.

Polyetheretherketone (PEEK) is a high performance, semi-crystalline thermoplastic. However, it is very difficult to overmould a second part comprising PEEK onto a first part comprising PEEK and achieve a strong bond between the first and second parts. It is an object of preferred embodiments of the present invention to address this problem.

It is also known to make components comprising first and second parts which comprise PEEK by use of epoxy resins to adhesively bond the first and second parts together. However, there are disadvantages with this approach, including the following:

(i) Any adhesive systems requires an undesirably long setting time;

(ii) The surfaces of the parts to be bonded require preparation, for example degreasing; and surface treatments, such as acid etches, laser treatment and mechanical roughening may be used;

(iii) Adhesives often involve a chemical reaction whereby they "set". Consequently, the quality of the bond will be dependent upon, for example, temperature and humidity which will, therefore, need to be controlled.

(iv) Adhesives are usually amorphous polymers which may lead to problems in terms of chemical resistance and long term mechanical performance of the components.

SUMMARY OF THE INVENTION

It is an object of preferred embodiments of the invention to address the aforementioned problems.

It is an object of preferred embodiments of the invention to provide processes and materials for producing components comprising first and second parts which are secured together with a high strength physio-chemical interaction (as opposed to solely a mechanical interaction), wherein the components have excellent chemical resistance and long term mechanical properties.

According to a first aspect of the invention, there is provided a component comprising a first part and a second part, wherein said second part is in contact with said first part, wherein:

(i) said first part comprises a first polymer which is semi-crystalline and includes phenylene moieties, carbonyl moieties and ether moieties;

(ii) said second part comprises a second polymer which is semi-crystalline and includes phenylene moieties, carbonyl moieties and ether moieties;

(iii) the melting temperature (Tm) of the second polymer is less than the melting temperature (Tm) of the first polymer.

A skilled person can readily assess whether a polymer is semi-crystalline, for example, by wide angle X-ray diffraction (also referred to as Wide Angle X-ray Scattering or WAXS) or by Differential Scanning calorimetry (DSC).

More particularly, the level and extent of crystallinity in a polymer may be measured by wide angle X-ray diffraction, for example as described by Blundell and Osborn (Polymer 24, 953, 1983); or by DSC in a process which is also described in POLYMER Vol. 37, Number 20, 1996, page 4573.

DSC may be used to examine the crystallinity in a polymer. From a DSC trace the onset of the Tg may be obtained as the intersection of lines drawn along the pre-transition baseline and a line drawn along the greatest slope obtained during the transition. The Tn is the temperature at which the main peak of the cold crystallisation exotherm reaches a maximum. The Tm is the temperature at which the main peak of the melting endotherm reaches a maximum. The Tc is the temperature at which the main peak of the crystallisation from the melt exotherm reaches a maximum.

The Heat of Fusion ($\Delta H$ (J/g)) may be obtained by connecting the two points at which the melting endotherm deviates from the relatively straight baseline. The integrated area under the endotherm as a function of time yields the enthalpy (mJ) of the transition, the mass normalised Heat of Fusion is calculated by dividing the enthalpy by the mass of the specimen (J/g). The level of crystallisation (%) is determined by dividing the Heat of Fusion of the specimen by the Heat of Fusion of a totally crystalline polymer.

The level of crystallinity in said first polymer may be at least 15%, suitably at least 20%, preferably at least 25% and, more preferably, at least 30%. In especially preferred embodiments, the crystallinity may be greater than 30%, more preferably greater than 35%, especially greater than 40%. The level of crystallinity may be less than 60%.

The level of crystallinity in said second polymer may be at least 15%, suitably at least 20%, preferably at least 25%. The level of crystallinity may be less than 60%, 50% or 40%.

The aforementioned methods provide the level of crystallinity in a bulk sample. As an alternative, FTIR may be used to assess crystallinity and this may be used to assess the level of crystallinity at a surface and/or across the thickness or surface of a sample. Reference is made to a paper titled "Crystallinity in Poly(Aryl-Ether-Ketone) Plaques Studied by Multiple Internal Reflection Spectroscopy" (Polymer Bull, 11, 433 (1984)). The crystallinity at the surface of the first and second polymers may be at the same levels described above.

In a preferred embodiment, DSC may be used to measure crystallinity of a bulk sample. FTIR may be used to measure crystallinity at a surface.

Preferably, said first polymer includes phenylene moieties bonded to carbonyl moieties; and phenylene moieties bonded to ether moieties; and preferably carbonyl moieties are not bonded to ether moieties. Preferably, said first polymer includes phenylene moieties bonded to two moieties selected from carbonyl moieties and ether moieties.

Preferably, said first polymer has a moiety of formula

I and/or a moiety of formula

II wherein m, r, s and w independently represent zero or a positive integer, E and E' independently represent an oxygen atom or a direct link, G represents an oxygen atom, a direct link or a —O-Ph-O— moiety where Ph represents a phenyl group and Ar is selected from one of the following moieties (i)**, (i) to (iv) which is bonded via one or more of its phenyl moieties to adjacent moieties

(i)**

(i)

(ii)

(iii)

(iv)

Unless otherwise stated in this specification, a phenyl moiety has 1,4-, linkages to moieties to which it is bonded.

In (i), the middle phenyl may be 1,4- or 1,3-substituted. It is preferably 1,4-substituted.

Said first polymer may include more than one different type of repeat unit of formula I; and more than one different type of repeat unit of formula II. Preferably, however, only one type of repeat unit of formula I and/or II is provided.

Said moieties I and II are suitably repeat units. In the first polymer, units I and II are suitably bonded to one another—that is, with no other atoms or groups being bonded between units I and II.

Phenyl moieties in units I and II are preferably not substituted. Said phenyl moieties are preferably not cross-linked.

Where w is greater than zero, the respective phenylene moieties may independently have 1,4- or 1,3-linkages to the other moieties in the repeat units of formulae II. Preferably, said phenylene moieties have 1,4-linkages.

Preferably, said first polymer consists essentially of moieties I and II.

Said first polymer may be a homopolymer having a repeat unit of general formula

IV or a random or block copolymer of at least two different units of IV, wherein A and B independently represent 0 or 1 and E, E', G, Ar, m, r, s and w are as described in any statement herein.

Phenyl moieties in repeat unit IV are preferably not substituted. Said phenyl moieties are preferably not cross-linked.

Suitably in IV, at least one of A and B represents 1.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably, said first polymer is a homopolymer having a repeat unit of general formula IV.

Preferably Ar is selected from the following moieties (xi)** and (vii) to (x)

(xi)**

(vii)

(viii)

(ix)

In (vii), the middle phenyl may be 1,4- or 1,3-substituted. It is preferably 1,4-substituted.

Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

Said first polymer suitably includes at least 60 mole %, preferably at least 70 mole %, more preferably at least 80 mole %, especially at least 90 mole % of repeat units which do not include S— or —SO$_2$— moieties. Said first polymer suitably includes at least 60 mole %, preferably at least 70 mole %, more preferably at least 80 mole %, especially at least 90 mole % of repeat units which consist essentially of phenyl moieties, ether moieties and ketone moieties.

An especially preferred class of first polymers are polymers (or copolymers) which consist essentially of phenyl moieties in conjunction with ketone and ether moieties. That is, in the preferred class, the first polymer does not include repeat units which include —S—, —SO$_2$— or aromatic groups other than phenyl. Preferred first polymers of the type described include:
- (a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).
- (b) a polymer consisting essentially of units of formula IV wherein E represents an oxygen atom, E' represents a direct link, Ar represents a moiety of structure (i), m represents 0, A represents 1, B represents 0 (i.e. polyetherketone);
- (c) a polymer consisting essentially of units of formula IV wherein E represents an oxygen atom, Ar represents moiety (i), m represents 0, E' represents a direct link, A represents 1, B represents 0, (i.e. polyetherketoneketone).
- (d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).
- (e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).
- (f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

The main peak of the melting endotherm (Tm) for said first polymer may be at least 300° C.

Said first polymer may consist essentially of one of units (a) to (f) defined above.

Said first polymer preferably comprises, more preferably consists essentially of, a repeat unit of formula (XX)

where t1, and w1 independently represent 0 or 1 and v1 represents 0, 1 or 2. Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have t1=1, v1=0 and w1=0; or t1=0, v1=0 and w1=0. The most preferred has t1=1, v1=0 and w1=0.

In preferred embodiments, said first polymer is selected from polyetheretherketone, polyetherketone, polyetherketoneetherketoneketone and polyetherketoneketone. In a more preferred embodiment, said first polymer is selected from polyetherketone and polyetheretherketone. In an especially preferred embodiment, said first polymer is polyetheretherketone.

Said second polymer may have any feature of the first polymer described above, provided the Tm of the second polymer is less than the Tm of the first polymer. The difference between the Tms of the first and second polymers may be at least 10° C., suitably at least 20° C., preferably at least 30° C., more preferably at least 35° C. The difference may be less than 60° C. or less than 50° C.

Preferably, said second polymer is a copolymer which comprises (preferably consists essentially) of two different units of formula IV.

Said copolymer preferably includes -Ph-Ph- moieties where Ph represents an unsubstituted phenylene moiety. Said second polymer preferably includes phenylene moieties bonded to two moieties selected from carbonyl moieties and ether moieties; and includes -Ph-Ph- moieties, suitably bonded to two ether moieties.

Preferably, said second polymer is a copolymer which comprises a first moiety of formula (XX) and a second moiety which includes -Ph-Ph- moieties where Ph represents an unsubstituted phenylene moiety. Said second moiety is preferably of formula IV, wherein Ar is selected from moieties (vii), (viii), (ix) and (x). Preferably, in this case, m, w and r represent 0 or 1.

Said second polymer may have a glass transition temperature (Tg) which is higher than the Tg of the first polymer.

Said first polymer may have a Tg of greater than 100° C. or greater than 120° C. The Tg may be less than 200° C. The Tg of said second polymer may be greater than 130° C., preferably greater than 135° C., more preferably 140° C. or greater. The Tg may be less than 175° C., less than 165° C., less than 160° C. or less than 155° C. The Tg is preferably in the range 145° C. to 155° C.

Said first and second polymers preferably both include a repeat unit selected from repeat units of formula (XX). Said first and second polymers suitably include at least 30 mole %, preferably at least 40 mole %, more preferably at least 50 mole %, especially at least 60 mole % of repeat units of formula (XX), which may be the same or different.

Said first and second polymers preferably include at least one identical repeat unit. Preferably, said first and second polymers include an identical repeat unit selected from repeat units of formula (XX) described above. Said first and second polymers suitably both include at least 30 mole %, preferably at least 40 mole %, more preferably at least 50 mole %, especially at least 60 mole % of said identical repeat unit. In a preferred embodiment, said first polymer includes at least 90 mole %, preferably at least 95 mole %, more preferably about 100 mole % of said identical repeat unit; and said second polymer includes at least 40 mole %, or at least 60 mole % of said identical repeat unit.

Said second polymer may include having a repeat unit of formula

—O-Ph-O-Ph-CO-Ph-    VI and a repeat unit of formula

—O-Ph-Ph-O-Ph-CO-Ph-    VII wherein Ph represents a phenylene moiety.

Said repeat units VI and VII are preferably in the relative molar proportions VI:VII of from 65:35 to 95:5.

Preferably, in said second polymer, the following relationship applies:

$$\log_{10}(X\%) > 1.50 - 0.26\ MV;$$

wherein X % refers to the % crystallinity measured as described in Example 13 and MV refers to the melt viscosity measured as described in Example 12.

The phenylene moieties (Ph) in each repeat unit VI and VII may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula VI have 1,4-linkages to moieties to which they are bonded. It is especially preferred that each phenylene moiety in the repeat unit of formula VI has 1,4-linkages to moieties to which it is bonded.

In a preferred embodiment, at least 95%, preferably at least 99%, of the number of phenylene moieties (Ph) in the repeat unit of formula VII have 1,4-linkages to moieties to which they are bonded. It is especially preferred that each phenylene moiety in the repeat unit of formula VII has 1,4-linkages to moieties to which it is bonded.

Preferably, the phenylene moieties in repeat unit of formula VI are unsubstituted. Preferably, the phenylene moieties in repeat unit of formula VII are unsubstituted.

Said repeat unit of formula VI suitably has the structure

VIII

Said repeat unit of formula VII suitably has the structure

IX

Said second polymer may include at least 68 mol %, preferably at least 71 mol % of repeat units of formula VIII. Particular advantageous polymers may include at least 72 mol %, or, especially, at least 74 mol % of repeat units of formula VIII. Said second polymer may include less than 90 mol %, suitably 82 mol % or less of repeat units of formula VIII. Said second polymer may include 68 to 82 mol %, preferably 70 to 80 mol %, more preferably 72 to 77 mol % of units of formula VIII.

Said second polymer may include at least 10 mol %, preferably at least 18 mol %, of repeat units of formula IX. Said polymer may include less than 32 mol %, preferably less than 29 mol % of repeat units of formula IX. Particularly advantageous polymers may include 28 mol % or less; or 26 mol % or less of repeat units of formula IX. Said second polymer may include 18 to 32 mol %, preferably 20 to 30 mol %, more preferably 23 to 28 mol % of units of formula IX.

The sum of the mol % of units of formula VIII and IX in said second polymer is suitably at least 95 mol %, is preferably at least 98 mol %, is more preferably at least 99 mol % and, especially, is about 100 mol %.

The ratio defined as the mol % of units of formula VIII divided by the mol % of units of formula IX may be in the range 1.8 to 5.6, is suitably in the range 2.3 to 4 and is preferably in the range 2.6 to 3.3.

The Tm of said second polymer may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

In a preferred embodiment, said second polymer has a Tg in the range 145° C.-155° C., a Tm in the range 300° C. to 310° C. and the difference between the Tm and Tg is in the range 145° C. to 165° C.

Said second polymer may have a crystallinity measured as described in Example 13 of at least 25%.

Said first polymer suitably has a melt viscosity (MV) of at least 0.06 kNsm$^{-2}$, preferably has a MV of at least 0.08 kNsm$^{-2}$, more preferably at least 0.085 kNsm$^{-2}$, especially at least 0.09 kNsm$^{-2}$. MV of said first polymer is suitably measured using capillary rheometry operating at 400° C. at a shear rate of 1000 s$^{-1}$ using a tungsten carbide die, 0.5 mm×3.175 mm. Said first polymer may have a MV of less than 1.00 kNsm$^{-2}$, suitably less than 0.8 kNsm$^{-2}$.

Said second polymer suitably has a melt viscosity (MV) of at least 0.10 kNsm$^{-2}$, preferably has a MV of at least 0.15 kNsm$^{-2}$, more preferably at least 0.20 kNsm$^{-2}$, especially at least 0.25 kNsm$^{-2}$. MV of said second polymer is suitably measured using capillary rheometry operating at 340° C. at a shear rate of 1000 s$^{-1}$ using a tungsten carbide die, 0.5 mm×3.175 mm. Said second polymer material may have a MV of less than 1.8 kNsm$^{-2}$, suitably less than 1.2 kNsm$^{-2}$.

Said first polymer may be part of a first composition which may include said first polymer and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said first composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said first polymer and said filler means are mixed at an elevated temperature, suitably at a temperature at or above the melting temperature of said first polymer. Thus, suitably, said first polymer and filler means are mixed whilst the first polymer is molten. Said elevated temperature is suitably below the decomposition temperature of the first polymer. Said elevated temperature is preferably at or above the main peak of the melting endotherm (Tm) for said first polymer. Advantageously, the molten first polymer can readily wet the filler and/or penetrate consolidated fillers, such as fibrous mats or woven fabrics, so the composite material prepared comprises the first polymer and filler means which is substantially uniformly dispersed throughout said first polymer.

The composite material may be prepared in a substantially continuous process. In this case first polymer and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising said first polymer. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of said first polymer and a predetermined amount of said filler means may be selected and contacted and a composite material prepared by causing the first polymer to melt and causing the first polymer and filler means to mix to form a substantially uniform composite material.

Preferably, said filler means comprises one or more fillers selected from glass fibre, carbon fibre, aramid fibres, carbon black and a fluorocarbon resin. More preferably, said filler means comprises glass fibre or carbon fibre.

A composition or composite material as described may include 20 to 99.9 wt % (e.g. 20 to 70 wt %) of said polymeric material and 0.1 to 80 wt % (e.g. 30 to 80 wt %) of filler means. Preferred embodiments include greater than 10 wt %, more preferably greater than 40 wt % of filler means.

Said second polymer may be a part of a second composition which may include said second polymer and a filler means. Said second composition may be as described for said first composition except that the second polymer replaces the first polymer in the first composition to produce the second composition.

Preferably, said second polymer is part of a second composition which comprises a fibrous filler (preferably selected from glass fibre, aramid fibre or carbon fibre) which is impregnated with said second polymer. Preferably, said fibrous filler is continuous. For example, fibres may have lengths of greater than 3 mm or greater than 10 mm. Said second composition may comprise woven fabric defined by said fibrous filler (e.g. in the form of a laminate) or a unidirectional tape, each of which includes a second polymer as described.

The aforementioned preferred second composition may be used with a first composition comprising said first polymer, optionally in combination with one or more fillers Said component suitably comprises said first and second parts in direct contact and suitably the bond between the parts is extremely strong. Whilst there may be a mechanical connection between the first and second parts, preferably the first and second parts are secured by chemical interaction between the first and second polymers. Thus, the force needed to separate the first and second parts is suitably greater (e.g. at least 10%, 25% or 50% greater) than the force that would be required to separate the same first and second parts if there was only a mechanical (and no chemical) interaction between the first and second parts.

The area of the first part in contact with the second part may be at least 10 cm$^2$, at least 25 cm$^2$ or at least 100 cm$^2$.

A thickness of the first part measured perpendicular to the interface between the first and second parts may be at least 2 mm or at least 4 mm. The thickness may be less than 20 mm, less than 15 mm or less than 10 mm.

A thickness of the second part measured perpendicular to the interface between the first and second parts may be at least 2 mm or at least 4 mm. The thickness may be less than 20 mm, less than 15 mm or less than 10 mm.

In a first embodiment, said first part overlies said second part. Said first part may comprise an overmoulded region on said second part. In the first embodiment, said second part may be filled or unfilled. For example, it may consist essentially of said second polymer or it may comprise said second composition referred to.

In a first example of the first embodiment, said second part may comprise a second composition (e.g. as referred to above), for example comprising a fabric (for example comprising glass fibre or carbon fibre) impregnated with said second polymer. A layer of said first polymer or a said first composition may contact the second part. The first example may comprise a composite laminate or composite panel. It may define a 3D structure for example a bracket or window frame. In this case, the first polymer or said first composition may define a fastening means for fastening the bracket or window frame to another structure.

In a second example of the first embodiment, the first and second parts may be arranged to define a relatively thick component (e.g. having a thickness of greater than 8 mm or greater than 20 mm) which would be difficult to make from a single polymer, for example due to residual stress that could be introduced during manufacture. An example is a thick walled pipe. In this case, the first and second parts may independently both have thicknesses of greater than 3 mm, 4 mm or 5 mm and the sum of the thicknesses of the first and second parts measured perpendicular to an interface between the parts may be at least 8 mm or at least 10 mm.

In a third example of the first embodiment, one or preferably both of said first and second parts may be unfilled and suitably consist essentially of said first and second polymers respectively. The first polymer may be overmoulded on the second polymer. The aforementioned may define a chemical mechanical planarization (CMP) ring.

In a fourth example of the first embodiment, the component may comprise a gear. In this case, said second part may define a support and said first part may define gear teeth mounted on the support. The second part is preferably filled, for example with a fibrous material for example in the form of a fabric.

In another embodiment, said component may include voids (which suitably allow the component to have a lower density compared to a component without such voids). Voids may be defined by virtue of the first part or second part. For example, the first part or second part may have a porous or honeycomb structure.

Said component of the first aspect may be for use in aerospace or automotive applications.

Said component may be selected from a bracket, window frame, pipe, connector, panel and CMP ring.

Said component may include at least 1 g (e.g. at least 10 g) of said first polymer and at least 1 g (e.g. at least 10 g) of said second polymer.

According to a second aspect of the invention, there is provided a method of making a component according to the first aspect, the method comprising:

(a) selecting a second part comprising said second polymer;

(b) selecting a first part comprising said first polymer or a precursor of said first part which comprises said first polymer;

(c) contacting said second part with said first part or said precursor.

Said first polymer and said second polymer may have any feature of said first polymer and said second polymer described in the first aspect.

When said first polymer is part of a first composition, step (c) may comprise contacting said first composition with said second part.

Preferably, in the method, said first part or said precursor of said first part is at a temperature above ambient temperature in step (c). It may be at a temperature of at least 50° C., at least 150° C., at least 250° C., at least 300° C. or at least 350° C. In step (c), said first polymer may be at a temperature which is greater than its Tm. In this case, the method may comprise moulding a precursor of said first part (e.g. molten first polymer, optionally including fillers) on and/or around said second part. Said second part may have a preformed, suitably solid, shape immediately prior to contact with said first part or precursor in step (c). Furthermore, preferably the shape remains substantially unchanged in the method because the shape is not completely melted and/or may only be slightly melted at a surface which contacts the first part or precursor in use. The method preferably includes introducing said second part into a tool, for example a mould such as a mould for injection moulding, and contacting said second part with a precursor of said first part (e.g. molten first polymer, optionally including fillers) in said tool. Thus, formation of said first part may comprise injection moulding, for example using a precursor of said first part. In step (c), preferably, a precursor of said first part is overmoulded on said second part. In said step (c), preferably at least a surface of the second part which is contacted with said precursor of said first part melts, suitably after contact with said precursor.

The method may include raising the temperature of said second part prior to contact with said first part or said precursor. The temperature may be raised to at least 100° C., at least 150° C. or at least 190° C. This may be done by heating the second part prior to introduction into a mould and/or introducing the second part into a heated mould. In one embodiment, a second part at ambient temperature may be introduced into a heated mould which will preferably increase the temperature of the part. Such a mould may be pre-heated to a temperature in the range 150-200° C.

Said first polymer and said second polymer are preferably miscible and/or compatible. Said first and second polymers are preferably such that a mixture of the polymers, in any proportions, exhibits a single glass transition temperature (Tg); such a mixture may also exhibit a single major maximum in its melting peak. Said first and second polymers are preferably miscible in all proportions to form a homogenous system. Said first and second polymers may be regarded as compatible if the polymers mix, do not change after mixing (for example there is no chemical reaction between the first and second polymers) and do not phase separate with time.

Said second polymer of said second part preferably remains substantially solid after said second part is contacted with said first part. Second polymer at a surface of the second part may be melted after said second part is contacted with said first part. Preferably, second polymer inwards of said surface is not melted after said second part is contacted with said first part.

In one embodiment, said second part may comprise a substantially planar part; and/or it may comprise a laminate. Thus, in this case, the second part suitably comprises a relatively simple structure. Such a second part may be overmoulded with said first polymer and/or said first composition, to define a second part which may define a relatively complex three-dimensional shape.

BRIEF DESCRIPTION OF THE DRAWINGS

Specific embodiments of the invention will now be described, by way of example, with reference to the following drawings, in which.

DETAILED DESCRIPTION

The following materials are referred to hereinafter:

Victrex 450G—refers to polyetheretherketone (PEEK) obtained from Victrex Manufacturing Limited.

Victrex 90HMF40—refers to PEEK having a melt viscosity of 0.09 KNsm$^{-2}$ with 40 wt % high modulus short carbon fibres.

Preferred polymeric materials for use in embodiments described herein were prepared as described in Examples 1 to 10 and the properties assessed as described subsequently.

Examples 1 to 10—Preparation of Polyetheretherketone (PEEK)-Polyetherdiphenyletherketone (PEDEK) Copolymer A 300 liter vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometers, were added. The D50 of the sodium carbonate was 98.7 μm. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C.

Table 1 below includes a summary of Examples 1 to 10. D50 as described herein was determined as described in Example 11.

Example 11—General Procedure for Determining D50

The D$_{50}$ of sodium carbonate was determined by Malvern Laser Diffractometer, using the associated Mastersizer 3000 software. A Fraunhofer type process was used to eliminate the requirement of refractive index figures for the samples. Using the Mastersizer 300 software, the following instrument parameters were set:

| | |
|---|---|
| Scattering Model | Fraunhofer |
| Background measurement duration | 10.00 s |
| Sample measurement duration | 10.00 s |
| Number of measurements | 2 |
| Obscuration low limit | 1% |
| Obscuration high limit | 6% |
| Obscuration time out | 5.00 s |
| Air Pressure | 1.5 barg |
| Feed Rate | 17% |
| Venturi type | Standard venturi disperser |
| Hopper gap | 2.00 mm |
| Analysis model | General Purpose |

A dried sample (<5 g) of carbonate was scooped into the hopper at the top of the machine. A background measurement was run, and then two sample measurements were taken. The feed rate was started at 17%, but was manually adjusted as the measurement was taken to ensure the obscuration measurement sat within the 1-6% limits.

The quantity of potassium carbonate used in Examples 1 to 10 was 4 mole % which is defined as:

$$\frac{\text{the number of moles of potassium carbonate}}{\text{the total moles of hydoxy monomer(s) used}} \times 100\%$$

Melt viscosity (MV) referred to in Table 1 may be determined as described in Example 12.

Example 12—Determination of Melt Viscosity (MV) of Polymer

Unless otherwise stated, this was measured using capillary rheometry operating at 340° C. at a shear rate of 1000 s$^{-1}$ using a tungsten carbide die, 0.5 mm×3.175 mm. The MV measurement was taken 5 minutes after the polymer had fully melted, which is taken to be 5 minutes after the polymer is loaded into the barrel of the rheometer.

TABLE 1

| Example No. | MV (@ 340° C.) |
|---|---|
| 1 | 0.25 |
| 2 | 0.203 |
| 3 | 0.258 |
| 4 | 0.283 |
| 5 | 0.324 |
| 6 | 0.222 |
| 7 | 0.26 |
| 8 | 0.269 |
| 9 | 0.186 |
| 10 | 0.295 |

Example 13—Differential Scanning Calorimetry of Polyaryletherketones of Examples 1 to 10

Crystallinity (as reported in Table 2) may be assessed by several methods for example by density, by it spectroscopy, by x ray diffraction or by differential scanning calorimetry (DSC). The DSC method has been used to evaluate the crystallinity that developed in the polymers from Examples 1-10 using a Mettler Toledo DSC1 Star system with FRS5 sensor.

The Glass Transition Temperature (Tg), the Melting Temperature (Tm) and Heat of Fusions of Melting (ΔHm) for the polymers from Examples 1 to 10 were determined using the following DSC method.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned by DSC as follows:

Step 1 Perform and record a preliminary thermal cycle by heating the sample from 30° C. to 400° C. at 20° C./min.
Step 2 Hold for 5 minutes.
Step 3 Cool at 20° C./min to 30° C. and hold for 5 mins.
Step 4 Re-heat from 30° C. to 400° C. at 20° C./min, recording the Tg, Tn, Tm, ΔHn and ΔHm.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

Results are provided in Table 2.

TABLE 2

| Polymer from Example | Tg (° C.) | Tm (° C.) | $\Delta H_m$ (J/g) | Level of Crystallinity (%) |
|---|---|---|---|---|
| 1 | 150.42 | 304.57 | 38.77 | 29.83 |
| 2 | 149.6 | 305.58 | 39.88 | 30.68 |
| 3 | 150.03 | 306.45 | 36.99 | 28.45 |
| 4 | 150.86 | 306.32 | 37.19 | 28.6 |
| 5 | 150.84 | 306.41 | 36.56 | 28.12 |
| 6 | 150.2 | 307.68 | 36.82 | 28.32 |
| 7 | 150.34 | 306.67 | 39.84 | 30.65 |
| 8 | 150.21 | 307.03 | 35.47 | 27.28 |
| 9 | 150.03 | 306.72 | 39.64 | 30.49 |
| 10 | 150.11 | 292.36 | 43.03 | 33.11 |

Example 14—Preparation of PEEK-PEDEK Blend

A dry powder blend of the polymers from Examples 6, 7 and 8 was made to produce a material of MV=0.25 KNsm$^{-2}$, a Tg of 149° C., a Tm of 302° C. and a crystallinity of 28.4%.

Example 15—Preparation of Pre-Consolidated Fabric Based Composite Incorporating PEEK-PEDEK Copolymer A powderous blend as described in Example 14 was sprinkled onto one surface of a woven de-sized carbon fabric and the copolymer heated such that it fuses and bonds to the surface of the fabric. This was repeated for the other side of the fabric to produce a "semi-preg". Layers of this material were cut, laid up and compression moulded, with the typical processing temperature being about 340° C.

Example 16—Testing of Composite of Example 15

Two tests (described below) were carried out on composite laminate approximately 2 mm thick of the type described in Example 15. Samples of the laminate were placed into a 150 mm×150 mm×4 mm plaque tool and Victrex 450G was injection moulded onto the surface of the laminate. The work was carried out using an Engel 740/220e injection moulding machine.

(i) A sample of the laminate 150 mm×150 mm was preheated to 250° C. in an oven and placed into the tool of the moulding machine, the tool being at 200° C. Victrex 450G was moulded onto the surface of the laminate. A section approximately 30 mm long had limited adhesion at the end of the plaque furthest away from the gate location. A screw driver was inserted into the gap between the laminate and the Victrex 450G and an attempt was made to break the bond formed. This proved to be impossible, the composite material kinking rather than any bond failing.

(ii) A sample of laminate approximately 100 mm×150 mm was preheated to 250° C. in an oven and inserted into the tool of an injection moulding machine, the tool being at 200° C. Victrex 450G was moulded onto the laminate such that there was a region approximately 50 mm long between the gate and the laminate. The bond formed was good over the whole surface of the laminate and attempts to break the bond resulted in the Victrex 450G layer fracturing, the fracture partially running across the bonded area with no loss of adhesion or delamination.

Examples 17—Testing of Overmoulded Samples

Samples for testing were made by moulding a 2 mm thick plaque from the PEEK-PEDEK copolymer of Example 14. This plaque was placed in an injection moulding tool, heated to a temperature of about 200° C., and overmoulded with a 2 mm thick layer of material comprising PEEK. In Examples 19 and 20, the PEEK-PEDEK plaque was pre-heated prior to introduction into the tool; Example 18 was introduced into the tool at ambient temperature.

Strips 10 mm wide were cut from the overmoulded plaques and subjected to a three-point bend test with a span of 80 mm. Results are provided in Table 3 below. A corresponding 4 mm thick, 10 mm wide test bar of Victrex 450G was also subjected to the same test. This result is shown in Table 4 below.

TABLE 3

| Examples | Materials | | Flex Strength (MPa) | Flex Strain (%) | Flex Modulus (GPa) | Maximum Flexural Stress | |
|---|---|---|---|---|---|---|---|
| | PEEK-PEDEK | PEEK | | | | Load (N) | Strain (%) |
| 18 | Example 14 Material | VICTREX 450G | 157 | 11.4 | 3.52 | 277 | 7.8 |
| 19 | Example 14 Material | VICTREX 90HMF40 | 151 | 17.4 | 3.35 | 268 | 7.7 |
| 20 | Example 14 Material | VICTREX 90HMF40 | 194 | 2.4 | 9.30 | 345 | 2.4 |

TABLE 4

| Example | Material | Flex Strength (MPa) | Flex Strain (%) | Flex Modulus (GPa) | Maximum Flexural Stress | |
|---|---|---|---|---|---|---|
| | | | | | Load (N) | Strain (%) |
| C1 | Victrex 450G | 149 | 16.0 | 3.38 | 265 | 7.5 |

The results show the mechanical properties of Examples 18 to 20 are comparable (or in many cases improved) over the results for comparative Example C1. Furthermore, for each of Examples 18 to 20, under the conditions, there was no delamination between the first and second parts.

The combination of polymeric materials described may have wide-ranging applications as described below:

(i) As an alternative to the use of fabric based composite laminates as described in Example 15, composite panels may be made from unidirectional (UD) tape incorporating PEEK-PEDEK copolymer.

(ii) A composite panel comprising PEEK (alone or in combination with fillers, especially fibres) could be manufactured. Initially, a composite panel comprising a PEEK-PEDEK pre-preg on one or more surfaces would be made and the combination overmoulded using a PEEK-based injection moulding compound so the PEEK forms a strong bond with the PEDEK layer as described.

iii) In general terms, complex 3-D parts may be formed by inserting relatively simple composite panels and bonding them together, with the addition of stiffeners and/or other structural components, by overmoulding them. Referring to FIGS. 2 to 5, a bracket comprises a rear plate 32 and front plate 34 both of which comprise a pre-cut composite laminate which includes PEEK-PEDEK copolymer with an injection moulded fillet 36. The bracket may be made by positioning plates 32, 34 in an injection moulding tool and the fillet 36 injected using a filled or un-filled PEEK thereby joining the plates together.

Figure 6:
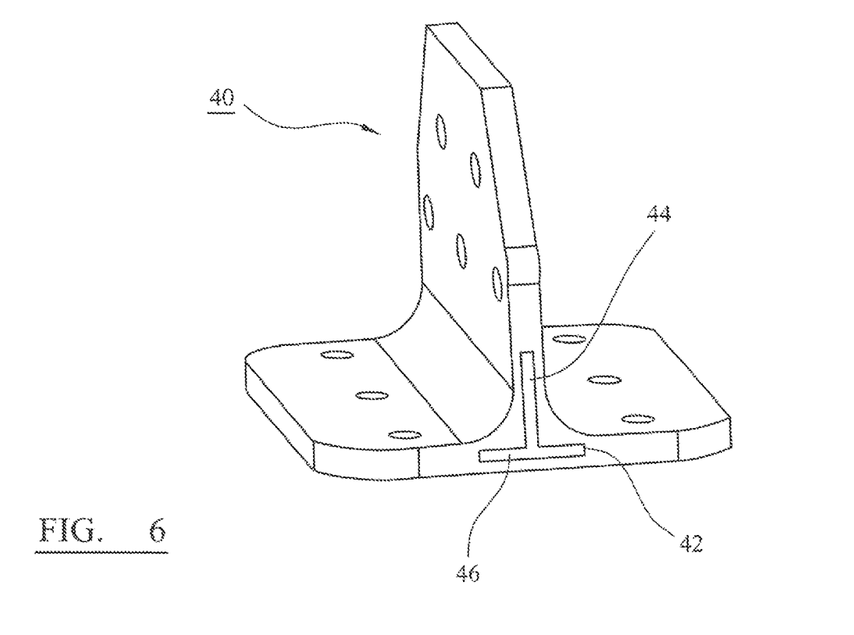
FIGS. 6 and 7 are perspective views of alternative brackets.
Figure 7:
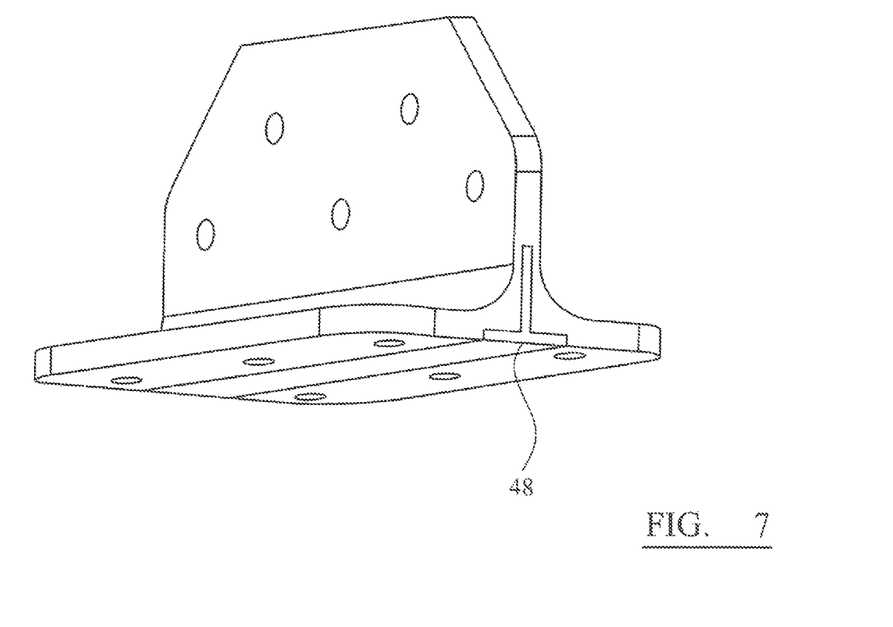

An alternative bracket 40, shown in FIG. 6, comprises a T-shaped composite insert 42 comprising laminated filled components 44, 46 which include PEEK-PEDEK copolymer. The insert 42 is completely overmoulded with PEEK or a PEEK-filled polymer to define the structure shown. The FIG. 7 embodiment is similar to the FIG. 6 embodiment, except that the insert 42 is only partially overmoulded—that is, it is not over-moulded on its lower face 48.

(iv) The combination of materials may be used in chemical-mechanical planarization (CMP) rings. There is a problem with CMP rings in that the desired materials of construction that come into contact with the grinding media must introduce no contamination to the surface of the wafers being polished. If relatively low modulus materials are used the rings can distort under load and this tends to result in the edges of the wafer being polished more than the central regions. In order to obtain a uniform polishing process across the whole face of the wafer a stiff, high modulus, support for the low modulus material is required. This can be achieved by moulding using mechanical fits to ensure that the low modulus and high modulus materials remain as a single component or by the use of metals. An example of the ring construction can be seen in WO1999062672A1. The ability to mould PEEK onto a support part comprising filled PEEK/PEDEK would mean that the desired ring performance could be achieved in a straight forward manner. For example, the area of the ring in contact with the polishing system could be made exclusively from PEEK and other parts of the ring which need to be very stiff could be made from a filled PEEK-PEDEK copolymer. It would also be feasible to machine the PEEK surface off the PEEK/PEDEK support and remould at a later date so that the rings could easily be refurbished.

Figure 1:
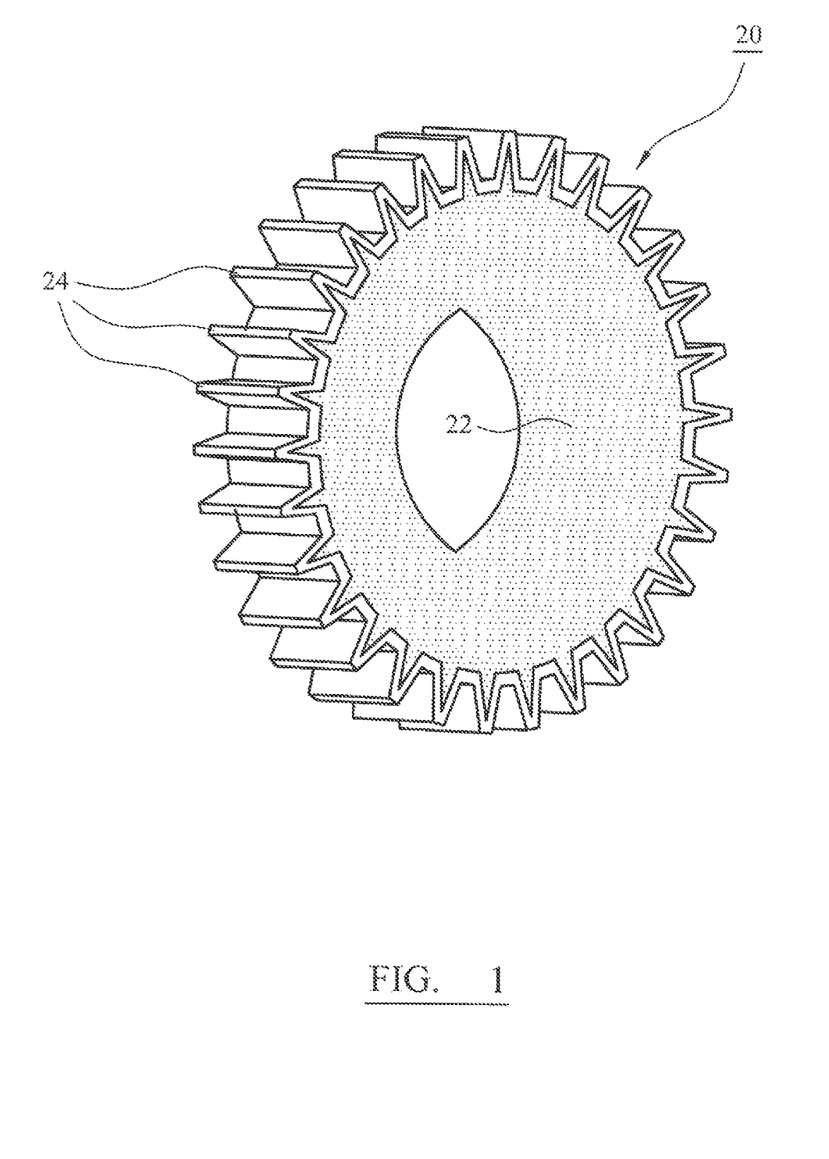
FIG. 1 is a representation of a gear.
Figures 2, 3:
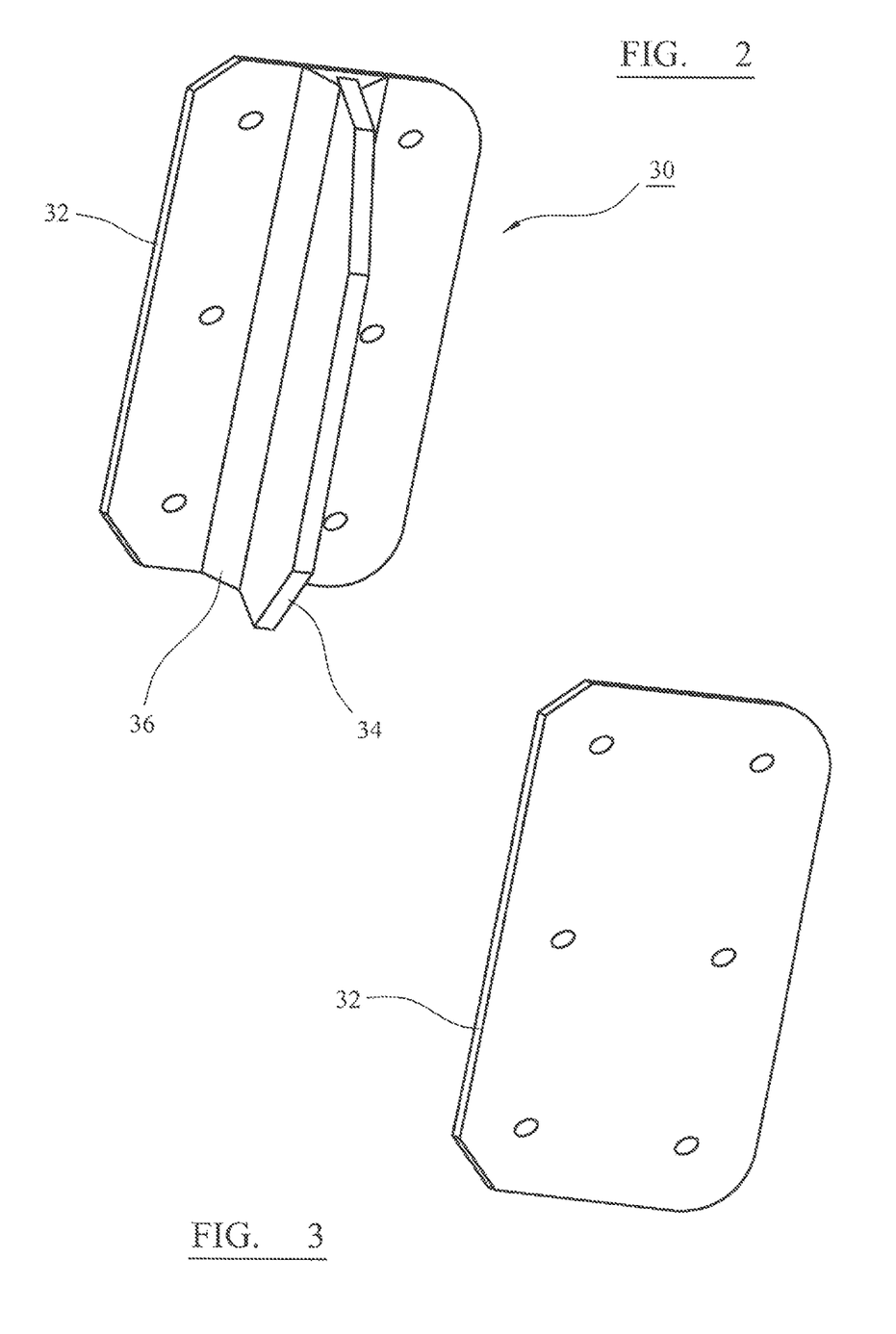
FIG. 2 is a perspective view of a bracket.
FIG. 3 is a perspective view of a rear plate of the bracket of FIG. 4.
Figures 4, 5:
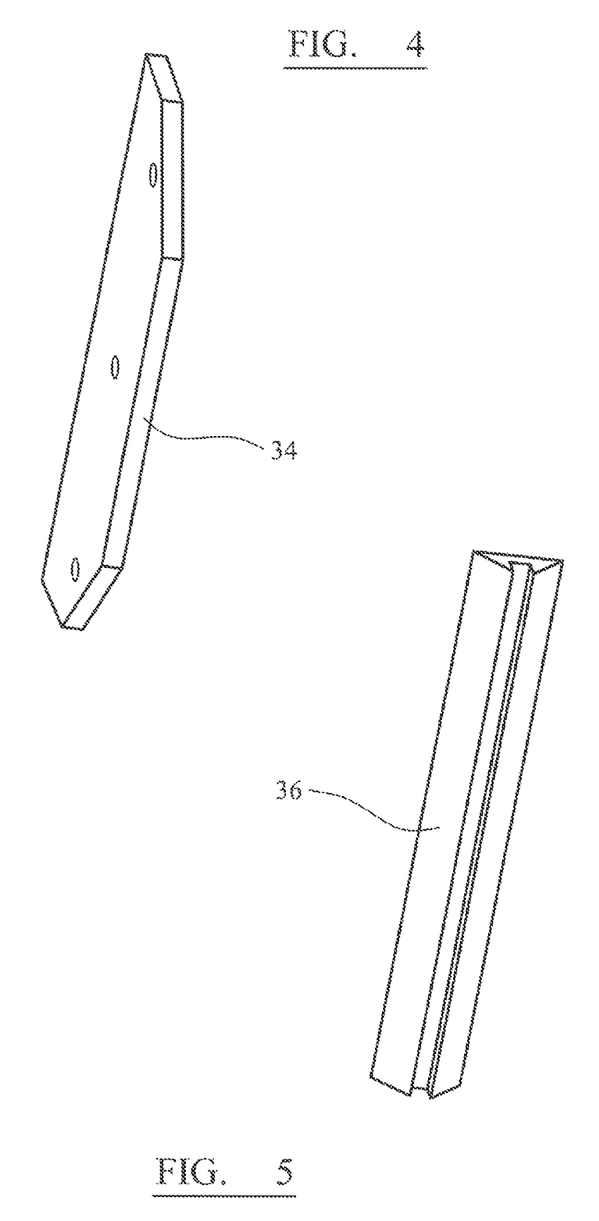
FIG. 4 is a perspective view of a front plate of the bracket.
FIG. 5 is a perspective view of a fillet of the bracket.

(v) The combination of materials may be used in making gears. Referring to FIG. 1, a gear 20 comprises an internal support 22 which is arranged to be mounted on a shaft (not shown). The support 22 may be made from the PEEK-PEDEK copolymer incorporating 30 wt % carbon fibre. The support could be overmoulded with unfilled PEEK to define teeth 24 to produce a gear which:

has a compliant tooth contact face and so noise would be reduced compared to a comparable gear which is made wholly from a carbon fibre filled polymeric material.

has a stiff base tooth form which will increase the torque transmission capability of the gear; and is cheaper to produce compared to known gears which include a metal support and polymer-based teeth mechanically coupled to the support.

(vi) The combination of materials may have wide-range applications for aerospace components. For example, aircraft window frames could be made from a first substantially planar part comprising fibre filled PEEK-PEDEK and more complex elements of the frame can be overmoulded using optionally-filled PEEK.

In general terms, relatively simple planar laminates comprising PEEK-PEDEK copolymer and fibres may be produced; and then overmoulded with PEEK, optionally containing fillers, to define more complex 3D shapes, with the bond between the copolymer and the PEEK being extremely strong.

(vii) Galvanic corrosion may be reduced. This is a problem in many large structures such as aircraft. Whilst carbon fibre composite does not in itself cause galvanic corrosion, it is a poor electrical conductor and so can carry small currents between dissimilar metals which will be subject to galvanic corrosion. The usual technique to overcome this problem is to use a layer of glass filled composite on the surface of the composite component, this acting as an electrically insulating layer. However, the use of glass fibre can be avoided. For example, in the case of a composite bracket comprising PEEK-PEDEK and carbon fibre, a glass-filled composite can be replaced by an overmoulded layer comprising 100% PEEK which is itself an excellent insulator and also serves to reduce the weight of the bracket.

(viii) Thick components may be produced with limited residual stress. In this regard, known components manufactured from polyaryletherketones (PAEKs), such as PEEK, can exhibit large amounts of residual stress. This is particularly true where the components have thick cross-sections because, during manufacture, the cooling rate in the centre of a cross-section is slow which results in relatively high levels of crystallinity in the centre, leading to shrinkage.

The ability to manufacture thick components in two stages could reduce the level of residual stress within the components. Examples of possible applications would be thick walled pipes where PEEK could be extruded over a pre-formed primary pipe made from PEEK-PEDEK copolymer. The physical properties of PEEK-PEDEK copolymer are not dissimilar to those of PEEK so most of the desired properties, for example chemical and abrasion resistance, would be retained but thicker walls could be produced.

Many downhole connectors use PAEKs for the encapsulation of metal pins in the connector. The thickness of the PEEK around the pin can often be very thick, often greater than 10 mm, and this presents problems when manufacturing the connectors using injection moulding. The section thickness and the inability to pack out the thick sections adequately can often result in voidage within the mouldings. If the pin was overmoulded in two stages, the problem of voidage could be overcome. The initial moulding would be with PEEK-PEDEK copolymer to produce a moulding with half the insulation thickness. This would then be placed into another tool so that the PEEK-PEDEK copolymer could be overmoulded with PEEK to produce the finished component with the full thickness of insulation. The overmoulding could be configured to fully encapsulate the PEEK-PEDEK copolymer if required. The formation of a good leak-free interface between the polymer layers is essential in such components. Evidence suggests that with PEEK and PEEK-PEDEK copolymer a very good bond is formed and so there will be no leakage path between the materials.

Figure 8:
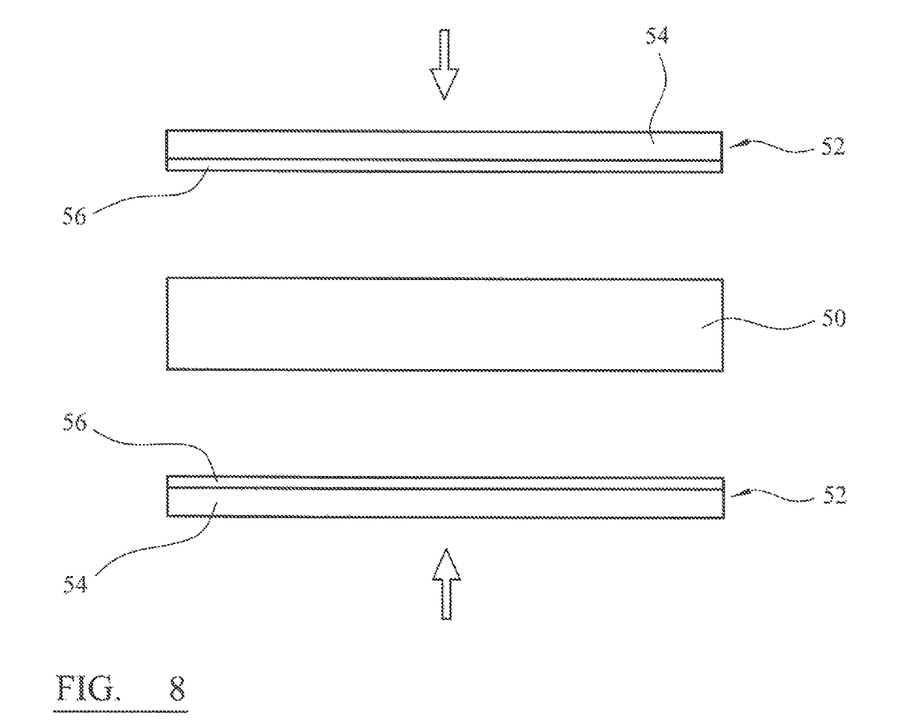
FIG. 8 is a schematic representation of a laminar structure including a honeycomb layer, prior to assembly.
Figure 9:
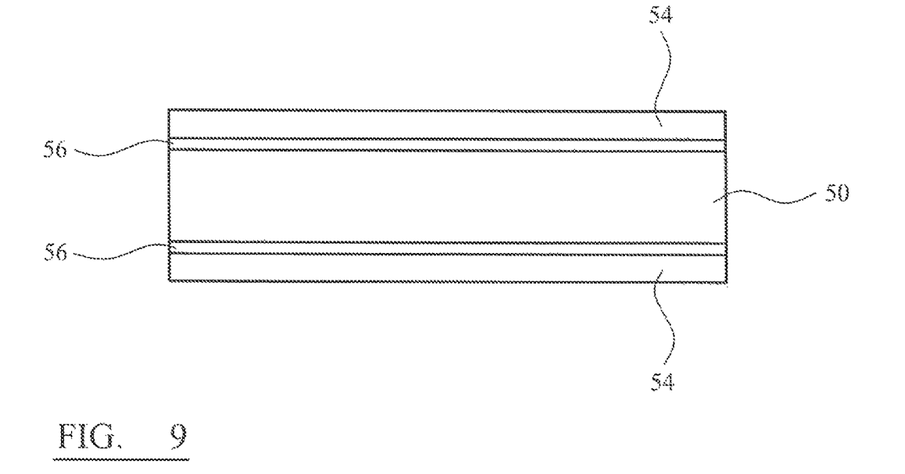
FIG. 9 is a schematic representation of the laminar structure of FIG. 8 after assembly.

(ix) The PEEK-PEDEK copolymer may be used in the manufacture of honeycomb based structures. FIG. 8 shows a light-weight honeycomb core 50 made from PEEK-PEDEK. On opposite sides of the core 50 are shown composite structures 52 each of which comprise a composite skin 54 made from PEEK and carbon fibre and a film layer 56 made from PEEK-PEDEK. The components shown in FIG. 8 may be pressed together and heated through the skins 54 to melt the film layers 56 so that the core 50 fuses to the composite structure 52, to define a structure as shown in FIG. 9.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A component comprising a first part and a second part, wherein said second part is in contact with said first part, wherein:
   (i) said first part comprises a first polymer which is semi-crystalline and includes phenylene moieties, carbonyl moieties and ether moieties;
   (ii) said second part comprises a second polymer which is semi-crystalline and includes phenylene moieties, carbonyl moieties and ether moieties and wherein said second polymer includes a repeat unit of formula —O-Ph-O-Ph-CO-Ph-      VI and a repeat unit of formula —O-Ph-Ph-O-Ph-CO-Ph-   VII wherein Ph represents a phenylene moiety;
   (iii) the melting temperature (Tm) of the second polymer is less than the melting temperature (Tm) of the first polymer; and
   wherein said first part is overmoulded onto said second part such that said first part is at least partially around said second part.

2. The component according to claim 1, wherein the level of crystallinity in said first polymer is at least 25% and the level of crystallinity in said second polymer is at least 20%.

3. The component according to claim 1, wherein said first polymer is a homopolymer having a repeat unit of general formula

IV or a random or block copolymer of at least two different units of IV, wherein A and B independently represent 0 or 1, and wherein m, r, s and w independently represent zero or a positive integer, E and E' independently represent an oxygen atom or a direct link, G represents an oxygen atom, a direct link or a —O-Ph-O— moiety where Ph represents a phenyl group and Ar is selected from one of the following moieties (i)**, (i) to (iv) which is bonded via one or more of its phenyl moieties to adjacent moieties

4. The component according to claim 1, wherein said first polymer comprises a repeat unit of formula (XX)

where t1, and w1 independently represent 0 or 1 and v1 represents 0, 1 or 2, and optionally wherein t1=1, v1=0 and w1=0.

5. The component according to claim 1, wherein said second polymer is a homopolymer having a repeat unit of general formula

IV

IX or a random or block copolymer of at least two different units of IV, wherein A and B independently represent 0 or 1, and wherein m, r, s and w independently represent zero or a positive integer, E and E' independently represent an oxygen atom or a direct link, G represents an oxygen atom, a direct link or a —O-Ph-O— moiety where Ph represents a phenyl group and Ar is selected from one of the following moieties (i)**, (i) to (iv) which is bonded via one or more of its phenyl moieties to adjacent moieties

6. The component according to claim 1, wherein said repeat units VI and VII are in the relative molar proportions VI:VII of from 65:35 to 95:5.

7. The component according to claim 1, wherein the following relationship applies in relation to the second polymer:

log 10(X %)≥1.50−0.26 MV;

wherein X % refers to the % crystallinity.

8. The component according to claim 1, wherein said repeat unit of formula VI has the structure

VIII and said repeat unit of formula VII has the structure and optionally wherein said second polymer includes 68-82 mol % of units of formula VIII and 18-32 mol % of units of formula IX.

9. The component according to claim 1, wherein said first polymer is part of a composition which includes said first polymer and a filler means.

10. The component according to claim 1, wherein said second part comprises a second composition comprising a fabric impregnated with said second polymer.

11. The component according to claim 1, wherein said component is selected from a bracket, window frame, pipe, connector, panel and CMP ring.

12. The component of claim 1, wherein the melting temperature (Tm) of the second polymer is at least 10° C. less than the melting temperature (Tm) of the first polymer.

13. The component of claim 1, wherein the melting temperature (Tm) of the second polymer is at least 35° C. less than the melting temperature (Tm) of the first polymer.

14. An aerospace component suitable for use in aerospace applications, the aerospace component comprising the component of claim 1.

15. A method of making a component comprising a first part and a second part, wherein said second part is in contact with said first part, wherein:
(i) said first part comprises a first polymer which is semi-crystalline and includes phenylene moieties, carbonyl moieties and ether moieties;
(ii) said second part comprises a second polymer which is semi-crystalline and includes phenylene moieties, carbonyl moieties and ether moieties and wherein said second polymer includes a repeat unit of formula —O-Ph-O-Ph-CO-Ph—      VI and a repeat unit of formula —O-Ph-Ph-O-Ph-CO-Ph—      VII wherein Ph represents a phenylene moiety;
(iii) the melting temperature (Tm) of the second polymer is less than the melting temperature (Tm) of the first polymer; and
wherein said first part is overmoulded onto said second part, the method comprising:
(a) selecting said second part comprising said second polymer;
(b) selecting said first part comprising said first polymer or a precursor of said first part which comprises said first polymer; and
(c) overmoulding said first part or said precursor onto said second part.

16. The method according to claim 15, wherein, in step (c), said first polymer is at a temperature which is greater than its Tm.

17. The method according to claim 15, the method including introducing said second part into a tool and contacting said second part with a precursor of said first part in said tool, and optionally wherein said tool is an injection moulding tool.

18. The method according to claim 15, wherein said first polymer and said second polymer are miscible and/or compatible.

19. The method according to claim 15, wherein said second polymer at a surface of the second part is melted after said second part is contacted with said first part, but a region of the second part inwards of said surface is not melted.

* * * * *